US012801559B2

(12) United States Patent
Coenen et al.

(10) Patent No.: US 12,801,559 B2
(45) Date of Patent: Nov. 17, 2026

(54) DAISY CHAIN CONNECTED MASTER-SLAVE COMMUNICATION SYSTEM AND A METHOD OF OPERATING THEREOF

(71) Applicant: VITO NV, Mol (BE)

(72) Inventors: Peter Coenen, Mol (BE); Dominique Weyen, Mol (BE)

(73) Assignee: VITO NV, Mol (BE)

( * ) Notice: Subject to any disclaimer, the term of this patent is extended or adjusted under 35 U.S.C. 154(b) by 0 days.

(21) Appl. No.: 18/832,954

(22) PCT Filed: Jan. 31, 2023

(86) PCT No.: PCT/EP2023/052330
§ 371 (c)(1),
(2) Date: Jul. 25, 2024

(87) PCT Pub. No.: WO2023/148167
PCT Pub. Date: Aug. 10, 2023

(65) Prior Publication Data

US 2025/0110912 A1 Apr. 3, 2025

(30) Foreign Application Priority Data

Feb. 1, 2022 (EP) .................................... 22154555

(51) Int. Cl.
*G06F 13/42* (2006.01)

(52) U.S. Cl.
CPC ...... *G06F 13/4247* (2013.01); *G06F 13/4282* (2013.01)

(58) Field of Classification Search
None
See application file for complete search history.

(56) References Cited

U.S. PATENT DOCUMENTS 5,914,957 A 6/1999 Dean et al.
10,341,026 B2 * 7/2019 Hellström ........... G06F 13/4063
(Continued)

FOREIGN PATENT DOCUMENTS

EP 2645638 A1 * 10/2013 ........... H04L 12/423
EP 3742679 A1 * 11/2020 ......... G06F 13/4247
(Continued)

OTHER PUBLICATIONS

Machine Translation of Japanese Patent Application JP 2016019058, published 2016. (Year: 2016).*
(Continued)

*Primary Examiner* — Steven G Snyder
(74) *Attorney, Agent, or Firm* — Ipsilon USA—NLO

(57) ABSTRACT

The invention relates to a daisy chain connected master-slave communication system, and a method of operating thereof. The system comprises a master and a concatenation of N slaves linked in a chain, wherein the master is connected to each of the N slaves through a communication line, wherein the system is configured to use the communication line for serial data communication from the master to the N slaves, wherein a n-th slave is connected with a (n+1)-th slave through a chain line, n being an integer of 1 or more and less than N, wherein the master comprises a communication port which is connected to a first slave of the N slaves through a first chain line, and wherein the system is configured to employ the chain lines for serial data communication from the slaves to the communication port of the master.

19 Claims, 5 Drawing Sheets

(56) References Cited

U.S. PATENT DOCUMENTS

| | | | | |
|---|---|---|---|---|
| 2002/0040452 | A1 | 4/2002 | Birk et al. | |
| 2004/0184476 | A1 | 9/2004 | Mrasek | |
| 2006/0020740 | A1* | 1/2006 | Bartley | G06F 11/201 711/100 |
| 2009/0144471 | A1* | 6/2009 | Lin | G06F 13/4252 710/110 |
| 2010/0283473 | A1* | 11/2010 | Vandensande | G01R 31/396 324/434 |
| 2011/0131445 | A1 | 6/2011 | Pyeon et al. | |
| 2012/0166695 | A1* | 6/2012 | Venus | G06F 13/4256 710/110 |
| 2013/0088237 | A1* | 4/2013 | Kamata | G01R 31/396 324/434 |
| 2013/0297829 | A1* | 11/2013 | Berenbaum | G06F 13/4256 710/36 |
| 2014/0173081 | A1* | 6/2014 | Knapp | H04L 61/5038 709/223 |
| 2014/0325104 | A1 | 10/2014 | Rohatschek et al. | |
| 2016/0098371 | A1 | 4/2016 | Murtaza et al. | |
| 2018/0089120 | A1* | 3/2018 | Riekstins | G06F 13/364 |
| 2018/0276157 | A1* | 9/2018 | Lofamia | G06F 13/404 |
| 2020/0286571 | A1* | 9/2020 | McCracken | G11C 7/1093 |
| 2021/0303503 | A1* | 9/2021 | Remple | G06F 9/30101 |

FOREIGN PATENT DOCUMENTS

| | | | | |
|---|---|---|---|---|
| WO | WO-2012110497 | A1 * | 8/2012 | H02J 7/56 |
| WO | WO-2020068093 | A1 * | 4/2020 | H04L 12/423 |

OTHER PUBLICATIONS

'LIN Extra Wire Daisy Chain Slave Node Position Detection' Revision 1.0, Dec. 2008. (Year: 2008).*

'EtherCAT Technical Introduction and Overview' Jul. 2005. (Year: 2005).*

* cited by examiner

DAISY CHAIN CONNECTED MASTER-SLAVE COMMUNICATION SYSTEM AND A METHOD OF OPERATING THEREOF

FIELD OF THE INVENTION

The invention relates to a daisy chain connected master-slave communication system comprising a master and a concatenation of N slaves linked in a chain. Furthermore, the invention relates to A method of communicating data between a concatenation of N slaves arranged in a daisy chain and interconnected by means of chain links and a master connected to each of the N slaves through a communication line. Additionally, the invention relates to a master device of a daisy chain connected master-slave communication system. The invention also relates to an apparatus comprising the daisy chain connected master-slave communication system. Further, the invention relates to a battery system with multiple battery cells.

BACKGROUND TO THE INVENTION

In various applications, it may be required to monitor and/or control a large number of units of a system or apparatus. The units may for instance be electrical components. Some exemplary applications are fuel cells, battery cells, photovoltaic cells, window actuators, mirror actuators, tyre pressure monitors, distributed sensor systems, lighting systems, etc. In these applications individual monitors and/or actuators, which can be referred to as slaves, are linked through a serial bus for data transfer to a master control unit. Each monitor and/or actuator node on the bus can be linked to a physical location (e.g. front/rear, left/right tyre, location in a battery, etc.) and it can be important to know, for diagnostics for example, which data is coming from which location.

In some examples, this can be achieved by identifying each node circuit with a unique address prior to installation and keeping track of its location. This can create difficulties in production and logistics as all nodes are different and each node must be mounted in the appropriate location or requires individual commissioning of the nodes. For example, modbus nodes on RS-485 (also known as TIA-485(-A) or EIA-485) employ such approach. RS-485 is a standard defining the electrical characteristics of drivers and receivers for use in serial communications systems.

Another, more efficient known method involves the extra wire daisy chain. Here an additional wire is added that is used to allow the nodes to acquire position information after installation and during the first boot process. This method is efficient but requires additional cabling that isn't used during normal operation. For example, the LIN bus uses this technique for identifying physical locations.

If a full-duplex communication is desired or even required, for example due to a relatively large amount of data to be received by the master, then an extra communication wire may be arranged, i.e. a first communication wire for allowing serial data communication between the master and the slaves in a first direction (e.g. from the master to the slaves), and a second communication wire for allowing serial data communication between the master and slaves in a second direction opposite the first direction (e.g. from the slaves to the master). However, such a technique, which is implemented in various applications in the art, has significant disadvantages. In some cases, an additional communication port has to be provided for each slave. Furthermore, integrating such additional wiring may be cumbersome and not feasible, especially for systems with a large number of slaves (e.g. battery system with a relatively large number of battery cells coupled to slaves). Moreover, such additional wiring to the slaves may also result in higher risks for failure.

In a half-duplex daisy chain connected master-slave communication system with one communication line, for example a first slave may send data to the master, and the master has to first wait until the data from the first slave is received, after which the second slave may send the data to the master when the communication line is available. The data transfer from the slaves happens one at a time, i.e. the next slave has to wait until previously queried slave returns data first, before it can transmit its data to the master. Such a configuration with one communication line may be too restrictive and inefficient, especially when a larger number of slaves are arranged in the daisy chain connected master-slave communication system.

There is a strong need to provide a master-slave communication system which can provide a bidirectional simultaneous communication between the master and slaves (cf. full-duplex) in a cost-effective and robust way.

SUMMARY OF THE INVENTION

It is an object of the invention to provide for a method and a system that obviates at least one of the above mentioned drawbacks.

Additionally or alternatively, it is an object of the invention to improve the design of a master-slave communication system.

Additionally or alternatively, it is an object of the invention to provide for an improved method of communicating data between a master and slaves in a master-slave communication system.

Thereto, the invention provides for a daisy chain connected master-slave communication system comprising a master and a concatenation of N slaves linked in a chain, wherein the master is connected to each of the N slaves through a communication line, wherein the system is configured to use the communication line for serial data communication from the master to the N slaves, wherein a n-th slave is connected with a (n+1)-th slave through a chain line, n being an integer of 1 or more and less than N, wherein the master comprises a communication port which is connected to a first slave of the N slaves through a first chain line, and wherein the system is configured to employ the chain lines for serial data communication from the slaves to the communication port of the master.

The first chain line, which is usable as a serial communication line, enables a cost-effective and robust way of achieving simultaneous bidirectional communication between the master and the slaves. The slaves are arranged in a daisy chain, and after configuration, the chain lines which are usable for configuration (cf. address assignment), can be effectively used for serial data transfer between the slaves and the master in addition to the communication line which provides a direct data coupling between the master and the slaves. Advantageously, with limited additional cabling the system can be used for simultaneous bidirectional communication between the master and the N slaves. In practical conditions, the first chain line may have limited impact on the complexity of the design. Hence, it can be prevented that an additional communication line has to be arranged providing a direct coupling between the master and the N slaves for providing simultaneous bidirectional communication between the master and the N slaves.

The system according to the disclosure provides a configuration that can provide a significantly higher bandwidth. The cables can be shorter, thus have lower parasitic capacitance which allows for higher bitrates. Furthermore, each transmitter may need to drive only one receiver, allowing for even higher bitrates. The data lines may not need to switch direction, thus no resulting delays required.

Optionally, the chain lines are used for configuration of the slaves and/or address assignment. Said configuration and/or address assignment may relate to an initial configuration and/or address assignment, or a further (re) configuration and/or address assignment.

Optionally, each slave has at least two ports.

Optionally, each slave comprises at least a first port and a second port, wherein the second port of the n-th slave is connected with the first port of the (n+1)-th slave. The slaves are thus connected in a chain by means chain lines connecting the second port of one slave with a first port of a subsequent slave. The last slave in the chain may not be connected to a subsequent slave. Therefore, its second port may be connected to ground. Additionally or alternatively, the second port of the last slave may be connectable to the master. In this way, the direction of configuration (cf. configuration mode) and/or communication (cf. communication mode) can be easily adapted. For the purpose of communication, the chain lines may be communication lines. The port(s) of the master connected to said chain lines can be configured to enable data communication. The first slave is connected to the master via the first chain line, connecting the communication port of the master to the first port of the first slave.

In some examples, each slave comprises a first port (cf. downstream port) connectable to a downstream (adjacent/neighboring) slave, and a second port (cf. upstream port) connectable to a upstream (adjacent/neighboring) slave. The first port of the first slave may be connectable to the communication port of the master via the first chain line. The second port of the last slave in the daisy chain configuration may be connectable to a ground, or to the master. Additionally or alternatively, each slave has a logic unit operable to determine if no upstream device is connected to the upstream port. In some examples, the upstream port receives an address assignment command from the upstream device, and wherein the address assignment command includes a first device address. The slave which has a direct connection with the master can be considered as the first slave and can be assigned a first address. The downstream port may transmit (updated) address assignment command to a downstream device.

By connecting the second port of the last slave in the daisy chain configuration to the master by means of a chain line, the design of the system can be significantly simplified. In such a case, optionally, the communication line providing data communication between the master and each of the slaves can be omitted. A two-way communication (bi-directional) communication can be obtained by means of the loop of the chain lines. The system can easily be operated in full-duplex mode with significantly less wiring.

A full duplex communication can be achieved without requiring a dedicated communication line connecting each of the slaves with the master. This can be obtained by providing a communication line (cf. last chain line) between the last slave and the master. The second communication port of the master (to which the last slave is connected by means of the last chain line) allows a communication line in the reverse direction to be obtained.

Optionally, the upstream port is connected to the upstream device (e.g. slave) via a single wire and the downstream port is connected to the downstream device (e.g. slave) via a single wire. For example, the downstream port of the first slave may also be connected to the master (downstream device for the first slave). Optionally, each slave has a dedicated port connected to the communication line.

A chain line may be arranged between each successive slave, connecting all the slaves together to form a chain of slaves. The first slave is connected to the communication port of the master via the first chain line. In some cases the first slave may be changed, for instance for changing the direction of configuration and/or direction of communication.

Optionally, the communication port is a serial data port, and wherein the chain lines form a serial communication link between the N slaves and the master for transferring sensory and/or status data of one or more slaves of the N slaves to the master.

The communication line may be configured to enable bidirectional communication. However, the communication line may not allow simultaneous bidirectional communication. In such a case, in a particular time span, the master can send data to the N slaves (e.g. request/query message) or the slaves can send data back through the same communication line. Instead of using the communication line in half-duplex mode (bidirectional, but not simultaneous in both directions), the system according to the invention is configured to enable additional serial communication of data through the chain lines. In this way, a full-duplex communication can be achieved in an advantageous way.

Optionally, the master is configured to output, process and/or transmit information associated to the received data from the one or more slaves. In some cases, the data is preprocessed prior to outputting and/or transmitting the information associated to the received data from the one or more slaves.

Optionally, the system is configured to enable full-duplex communication between the master and the N slaves, wherein the system is configured to employ the communication line for unidirectional communication from the master to one or more slaves of the N slaves, and wherein the system is configured to employ the chain lines for unidirectional communication from one or more slaves of the N slaves to the master, and/or vice versa.

In some cases, a large amount of data is to be collected by the master from the N slaves, and/or a large number of slaves are arranged in the system, making it strongly desired to use the system in full duplex, instead of carrying out half-duplex communication.

Optionally, the system is configured to be switchable between a configuration mode, in which for performing daisy chain communication address assignment using the chain lines (e.g. chain lines are usable as address lines), and a communication mode, in which master-slave data communication is performed. In communication mode, a simultaneous bidirectional communication between the master and the slaves can be achieved (cf. full-duplex communication) in an advantageous way.

Optionally, the master is configured to selectively configure (e.g. change logic state) the first data port of the first slave in a configuration process/mode.

Optionally, the master comprises a control circuit. The system can be selectively operated in configuration mode and communication mode.

Optionally, in configuration mode, the master is configured to make an output of the communication port of the master switchable between two logic states (e.g. "0"-"1"; "low"-"high"). The communication port is connected to the first port of the first slave via the first chain line, and thus the state of the first port can be easily switched during configuration. In configuration mode, an address distribution may be carried out. Information with regard to a (physical) location of the slaves and/or devices associated to said slaves (e.g. sensors and actuators) can be determined during the configuration process. In communication mode, the communication port of the master can be used for serial data communication (e.g. receive serial data from the chained slaves).

In some cases, all of the slaves are queried to send their data (if available) to the master. For example, for a battery system application, data associated to each monitored battery cell (e.g. temperature, voltage, etc.) can be forwarded from the slaves to the master. The communication process may start with each slave sending its own information downstream.

The chain lines arranged between the slaves can be used as configuration wires when the system is operated in configuration mode. However, in addition, these chain lines are also usable as communication wires when the system is operated in communication mode. Serial data from the slaves can be communicated to the master via the first chain line providing a serial data communication connection between the first slave and the master.

The slaves may be configured to receive data from the upstream adjacent slave and send said data to a downstream adjacent slave. This process may be repeated until all queried slave have sent their data to the master.

Optionally, each of the N slaves is configured to forward an entire set of data signals received from its preceding slave in the chain to another slave in the chain until the set of data signals reaches the master via chain lines.

In some examples, the slaves are configured in such a way that if no data has to be sent to the master, the data from a next slave (i.e. upstream) is passed on. For example, if the first slave has no data to transmit to the master, the first slave may pass on the data from the second slave, etc. For example, if the third slave has to send data to the master, then the data can be transmitted via the first port of the third slave, which is then received by the second port of the second slave, which can then pass it on to the first slave via its first port which is in communication with the second port of the first slave. The serial data received on the second port of the first slave can then be sent to the master via the first port of the first slave. In this way, the data from the third slave can be received by the master. However, in the meantime, the master can communicate and send data to the slaves via the communication line. In this way, a full-duplex communication can be achieved in an advantageous way.

Optionally, each slave comprises a memory module.

Optionally, each of the N slaves are configured to transmit their data to a downstream neighbor slave in case of a broadcast request sent by the master to the slaves, wherein the data is buffered and sent out to a downstream neighbor slave as soon as the slave has finished transmitting its own data.

For example, the first slave may send its data to the master through the first port connected to the communication port of the master via the first chain line. The second slave may be configured to wait, and when the first slave has finished, then the second slave may pass its data to the first slave, which can the pass the data on to the master. The master may be configured to first receive data from the first slave and then data from the second slave, etc. Hence, data of the successive slaves is received at the communication port of the master in the correct order.

Optionally, at least a set of the N slaves is configured to process received data from an upstream slave prior to forwarding the data to a downstream slave. Optionally, each slave is configured to perform such processing. In some examples, a communication driver is used for performing said processing. The processing may involve for example reducing/mitigating noise, jitter, and/or distortions in the received data and/or performing reshaping of the data. Various signal processing and/or modulation techniques may be employed.

Advantageously, in this way it can be prevented that small distortions in the signal may accumulate at each slave. So with a long chain of slaves, it can be prevented that the distortions can become larger in the downstream direction.

Optionally, each of the N slaves are configured to transmit their data to a downstream neighbor slave in case of a broadcast request sent by the master to the slaves, wherein the data is directly piped from one slave to another until the data transmitted by all the slaves has been received by the master.

All messages of the slaves may be initiated by the master. A slave may reply to a given message identifier. Since all communications are initiated by the master, it may not be necessary to implement a collision detection.

For example, all slaves may be configured to directly forward their data to the downstream neighbor/adjacent slave. The data from the successive slave may arrive at the communication port of the master in the correct order.

Optionally, the system has a preset first communication path from the master to all the slaves, and a preset second communication path from the chained slaves to the master.

Optionally, the master is configured to receive data packages in an order in which the slaves are connected to each other in the daisy chain, and wherein the master is configured to determine locations of the slaves in the daisy chain based on said order.

The system may be configured to enable bidirectional data communication between the master and the slaves. At least the master may be configured to instruct the slaves to perform some action and will provide synchronisation between slaves as they measure, actuate or communicate their data. According to the system of the disclosure, it is possible to create a full duplex system. The first slave's input (i.e. first port) to the master, the normal configuration procedure can be performed. Once the configuration has been completed, the daisy chain wires (i.e. chain lines) are used for communication towards the master. This can be done by reconfiguring I/O pins of the slave to UART pins for example.

When the slave ports (e.g. pins), namely the first port and the second port, are configured for communication (normal operation) they are set to receive data from an upstream neighbour and send data to a downstream neighbour in the direction of the master. For example, the two UART pins (RX and TX) may thus not be connected point to point.

When the master requests data from the slaves by issuing a broadcast request, all slaves transmit their data to their downstream neighbour. Here the data may be optionally buffered and sent out as soon as the downstream slave has finished transmitting its own data.

Below, a table is provided for an exemplary system with four slave.

TABLE 1 exemplary data transfer using chain lines of a system with four slaves and one master.

| Time slot | Master | Slave 1 | Slave 2 | Slave 3 | Slave 4 |
|---|---|---|---|---|---|
| 1 | Rx D1 from S1 | TX D1 to MA<br>RX D2 from S2 | TX D2 o S1<br>RX D3 from S3 | TX D3 to S2<br>RX D4 from S4 | TX D4 to S3 |
| 2 | Rx D2 from S1 | TX D2 to MA<br>RX D3 from S2 | TX D3 to S1<br>RX D4 from S3 | TX D4 to S2 | |
| 3 | Rx D3 from S1 | TX D3 to MA<br>RX D4 from S2 | TX D4 to S1 | | |
| 4 | Rx D4 from S1 | TX D4 to MA | | | |

In the above exemplary table, S1-S4 are respectively the first-fourth slave, D1-D4 are respectively data packages from first-fourth slave, and MA is the master. TX denotes a transmission action and RX denotes a receive action.

Data packages (D1-D4) are received by the master in the order in which the slaves are connected to each other, the physical location is determined by the order of the cabling.

Optionally, the N slaves are associated to sensors and/or actuators.

In some examples, the slaves are associated to one or more sensors and/or (state) monitoring devices, for example monitoring a temperature, electrical value, etc. Additionally or alternatively, the slaves may be associated to actuators. The actuators may receive data and perform one or more actions based on said received data (e.g. interior lighting in a vehicle).

In some examples, the slaves are associated to both a sensor and an actuator. In battery systems for example, the slave may be associated to one or more sensors monitoring sensory data (e.g. voltage, temperature, etc.) and one or more actuators (e.g. injecting balancing current into a battery cell).

Advantageously, the first ports and the second port of the slaves are not only used in configuration mode, but also in communication mode for transferring serial data from the slaves to the master and/or vice versa. A simultaneous bidirectional communication can be achieved between the master and the slaves in a cost-effective and robust way.

In some examples, the data from a selected/queried slave is guided through one or more chain lines to the master. For example, if a third slave is queried to provide data to the master, the third slave can transmit its data to the second slave through the chain line connecting the first port of the third slave to the second port of the second slave, and similarly, the second slave can transmit the data to the first slave, and the first slave can transmit the data to the master.

Optionally, each slave is associated to a sensor arranged at a battery cell.

In battery systems with multiple cells, it may be needed to monitor one or more parameters of multiple cells. This may be performed in a master-slave configuration, wherein at least one slave is associated to each of the monitored cells. For example, such a battery system may include more than 100 cells which are to be monitored. In such an example, there may be for instance 100 slaves, each slave coupled to one battery cell. Setting up additional wires between the slaves and the master may be a challenging task, for example prone to errors, failure, etc. Furthermore, such an additional wiring may result in a significantly more complex design, increasing the costs. The system according to the disclosure may provide for a cost-effective, effective and reliable solution for obtaining simultaneous bidirectional communication between the master and the N slaves (cf. full duplex).

The importance of high bandwidth in combination with low wire count, short wires and automatic configuration can be seen when observing large battery systems. The battery systems may be composed of hundreds of cells, each cell may require some form of monitoring (cf. sensory data). A lot of data needs to be transported to a master over a considerable distance as these batteries may occupy entire buildings in some examples. If the monitoring circuit is integrated in the battery cell, every additional wire needs proper gastight sealing. The system according to the disclosure may provide significant advantages when applied for battery systems. However, it will be appreciated that the system may be employed in various other systems.

In some examples, the system has more than 20 slaves, preferably more than 40 slaves, even more preferably more than 80 slaves.

Optionally, the N slaves are identical devices.

By employing identical slaves, setting up the system may become significantly less labour-intensive. The production process for the system can be simplified. Advantageously, the daisy chaining allows to perform address assignment after installation by means of a configuration step. Even when the set-up of the system is changed (e.g. additional slaves added), the address assignment can be simply performed by means of the configuration process.

Optionally, the master is in parallel connection with each of the N slaves through the communication line, wherein the parallel connection provides a direct communication between the master and the N slaves.

The communication line may be a physical communication line configured to allow communication in one direction at a time. Therefore, simultaneous bidirectional communication via the communication line may not be possible.

Optionally, the master is in series connection with the N slaves through the chain lines, wherein the series connection provides an indirect communication between the master and at least a subset of the N slaves.

If one of the slaves fails to operate correctly, then in some cases no more data may be sent from said defective slave (e.g. output defective) and/or no more data may be received from the upstream neighbouring slave. For example, if a third slave fails, the master may receive only data from the first and second slave, and possibly from the third slave (e.g. if its first port is not defective). In this way, it can be easily determined where the defect occurs (i.e. operational failure at the input (first port) of third slave or at the output (second port) of the third slave). A robust diagnosis can be performed as the location of the operational failure can be effectively identified.

Optionally, an additional chain line may be provided connecting the communication port of the master to the last slave. The additional chain line may be connected to the second port of the last slave. In this way, during configuration, the direction of configuration can be selected. For example, in case of starting with the first slave, it is possible to start with the last slave. This can be performed by adequately setting the second port of the last slave in a predetermined state (e.g. “0”/“low” or “1” “high” depending on the used convention during configuration). This provides more flexibility during configuration. However, advantageously, this can also provide for a more robust system. For instance, when one of the slaves is defective (e.g. failure), the location of the failure can be determined based on the data received from the master. However, if data is only receivable from the slaves to the master in one direction through the chain lines, some data may be blocked by the defective slave. By providing the additional chain line connected to the last slave, it is also possible to receive data in the opposite direction (e.g. bypassing the failing/defective slave). In this way, more data can be obtained, even during failure of one of the slaves.

Similar to the first chain line, the last chain line can be used for transferring serial data from the slaves to the master. The first and last chain lines may be connected to a communication port. In some examples, the first and last chain lines are connected to the same or different communication port of the master. However, it is also envisaged that the first and last chain lines are connected to two different communication ports of the master.

If the first and last chain lines are connected to the same communication port of the master, the system may include anti-collision means configured to prevent data collision during data communication. In some examples, it may be prevented that two slaves transmit data simultaneously via the same line. This can be done in different ways (e.g. time slots, priority system, etc.). In some examples, the data collision is prevented by means of a protocol layer.

It will be appreciated that the plurality of chain lines can provide a communication path between the master and the chained plurality of slaves. The daisy chain lines can be used for serial data communication between the slaves and the master (cf. communication mode/process). However, these daisy chain lines may also be used for configuration the slaves (cf. configuration mode/process).

Optionally, (re) configuring the slaves in configuration mode is performed in response to a command communicated by the master over at least one of the communication line or the chain lines.

Optionally, the master is configured to determine a total number of slaves connected thereto. This may be performed in the configuration mode/process. This may for instance be the case for modular systems, in which slaves can be added and/or removed.

In configuration mode, the master may be configured to initially send a command to initialize the N slaves. In some examples, the system is configured such that when an initialization command is sent out by the master, the first slave may detect a state of a first port.

Once the configuration has been completed, the system may switch from a configuration mode to a communication mode. Then the plurality of chain lines are used a secondary communication line. In this way, a full-duplex communication between the master and the slaves can be achieved in a cost-effective and reliable way. Advantageously, the system has a robust design. The chain lines can be effectively used both in the configuration mode and the communication mode.

Hence, the system enables a two-way simultaneous communication between the master and the slaves. The communication port of the master is connected to the first port of the first slave, wherein the first slave is chained to the second slave via a chain line arranged between the first slave and the second slave. If the system has three or more slaves for example, the second port of the second slave is connected to the first port of the third slave via a chain line arranged between the second and third slaves, etc.

Optionally, the system is configured to detect and/or identify topology changes, wherein the topology change comprises at least one of an additional slave added to the system, a slave in the system is removed (and/or operational failure), a slave is powered on, or a slave in the system is powered off.

According to an aspect, the invention provides for a daisy chain connected master-slave communication system comprising a master and a concatenation of N slaves linked in a chain, wherein a n-th slave is connected with a (n+1)-th slave through a chain line, n being an integer of 1 or more and less than N, wherein the master comprises a first communication port which is connected to a first slave of the N slaves through a first chain line, and wherein the master comprises a second communication port which is connected to a last slave of the N slaves through a last chain line, and wherein the system is configured to employ the chain lines for serial data communication between the slaves and the master.

Advantageously, such a system configuration enables a full duplex communication without the need of a communication line connecting each of the slaves with the master. The last chain line connecting the last slave with a second communication port of the master enables a significantly simpler design of the system. A more cost-effective system can be obtained this way, requiring less wiring and/or less wired connections between slaves and the master.

The second communication port of the master (to which the last slave is connected by means of the last chain line) allows a communication line in the reverse direction to be obtained. The connection of the last slave to a second communication port of the master enables a serial data communication in the reverse direction. The chain lines can be used for a two-directional communication between the master and slaves.

According to an aspect, the invention provides for a method of communicating data between a concatenation of N slaves arranged in a daisy chain and interconnected by means of chain lines and a master, wherein a n-th slave is connected with a (n+1)-th slave through a chain line, n being an integer of 1 or more and less than N, wherein the master is provided with a first communication port which is connected to a first slave of the N slaves through a first chain line, and wherein the master is provided with a second communication port which is connected to a last slave of the N slaves through a last chain line, and wherein the system is configured to employ the chain lines for serial data communication between the slaves and the master.

According to an aspect, the invention provides for a master device of a daisy chain connected master-slave communication system according to the disclosure, wherein the master device comprises at least two different communication ports, one port connectable to the communication line for transmitting serial data, and another port connectable to the first chain line for receiving serial data.

The master can enable a full duplex connection with a limited cabling. The daisy chaining may be arranged in order to establish a physical position of the slaves.

According to an aspect, the invention provides for a method of communicating data between a concatenation of N slaves arranged in a daisy chain and interconnected by means of chain links and a master connected to each of the N slaves through a communication line, wherein a n-th slave is connected with a (n+1)-th slave through a chain line, n being an integer of 1 or more and less than N, wherein the master is provided with a communication port which is connected to a first slave of the N slaves through a first chain line, wherein the communication line is used for serial data communication from the master to the N slaves, and wherein the chain lines are used for serial data communication from the slaves to the communication port of the master.

Advantageously, the chain lines, which can be employed as configuration lines during configuration mode, can be usable as communication lines for transmitting and/or receiving serial data from the slaves to the master (and/or vice versa).

As the first chain line is connected to the communication port, serial information can be received from the N slaves through the chain lines connecting the slaves together in order to form a chain network arrangement. The communication port may be configured to receive consecutive bits of data. The master may be configured to process and/or store the data. However, the same communication port can also be used, for example during configuration mode of the system, for changing a logic state of the first port of the first slave (e.g. switch between "low"/"0" and "high"/"1").

Optionally, a communication process is initiated subsequent to a configuration process. During configuration, the master may be configured to set an appropriate state of the first port (e.g. "0"/"low" state for the example described above) via the first chain line providing a connection between the communication port and the first port of the first slave. The successive slaves in the chain can then be configured sequentially. Once the configuration has been completed, the communication port of the slave can be employed for receiving (or alternatively transmitting) serial data. Advantageously, the master can receive serial data from the N slaves through the multiple chain lines linking the master and slaves in a chain.

According to an aspect, the invention provides for an apparatus, comprising the system according to the invention.

According to an aspect, the invention provides for a battery system comprising a daisy chain connected master-slave communication system according to invention.

According to an aspect, the invention provides for a method for addressing a physical location of slaves of the system.

In batteries with multiple cells, typically a relatively large amount of data has to be monitored. The invention provides an advantageous daisy chain connected master-slave communication system which can be operated in full-duplex mode (cf. simultaneous bidirectional communication between the master and the slaves). The system can effectively handle the data traffic from the slave to the master.

The master may regularly monitor sensory data associated to battery cells. If one or more predetermined monitored parameters (e.g. cell voltages, temperatures) are too high or too low, an action may be taken in order to make the battery system safe. For example, as a measure, the main contacts of the battery may be interrupted.

For a battery application, the system may include means configured for avoiding high voltage being applied to communication ports (e.g. galvanic isolation).

The system and method according to the invention can be used for various other applications, such as for example in fuel cells, photovoltaic cells, window actuators, mirror actuators, tyre pressure monitors, distributed sensor systems, lighting systems, etc According to an aspect, the invention relates to a method of configuring the master-slave communication system.

According to an aspect, the invention relates to a vehicle sensing system using the daisy chain connected master-slave communication system. At least a set of the slaves may be connected to sensors used by the vehicle sensing system.

The terms "a" and "an" do not denote a limitation of quantity, but rather denote the presence of at least one of the referenced items. The term "or" is meant to be inclusive and mean either or all of the listed items. The use of "including," "comprising," or "having," and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "slave", "master", and "controller" may include either a single component or a plurality of components, which are either active and/or passive and are connected or otherwise coupled together (for example, as one or more integrated circuit chips) to provide the described function.

It will be appreciated that in some examples, the communication line providing a direct (data) connection between the master and each of the slaves may be optional. For example, a full-duplex communication can still be obtained by arranging a chain line between the last slave and the master. In such advantageous example, the wiring of the system can be significantly simplified whilst providing a full duplex communication between the master and slaves.

It will be appreciated that terms such as "upstream" and "downstream" may be related to the direction of data transfer. For example, data may be transmitted from upstream units to downstream units. Other conventions may also be used.

It will be appreciated that various methods for assigning (unique) device addresses to the series of slaves of the system may be employed. In configuration mode, the system can perform auto-discovery and/or auto-enumeration of the serially interconnected slaves (in daisy-chain arrangement). An address may be assigned to each of the slaves. Each slave in the system can be discovered, and each slave can be enumerated.

It will be appreciated, that the communication port of the master, and the first and second ports of the slaves may be configured to receive/transmit data in the form of bits. In some examples, data can be forwarded only when 8 bits have been received (corresponding to one byte). Various serial data communication configurations may be employed.

It will also be understood that, when a feature or element is referred to as being "connected", "attached" or "coupled" to another feature or element, it can be directly connected, attached or coupled to the other element or intervening elements may be present. In contrast, when a feature or element is referred to as being "directly connected", "directly attached" or "directly coupled" to another element, there are no intervening elements present. Although described or shown with respect to one embodiment, the features so described or shown can apply to other embodiments.

It will be understood that although the terms "first", "second", "further", "additional", "last" are used herein to describe various components, these components should not be limited by these terms. These terms are only used to distinguish one component from another component. Thus, a first component discussed herein could be termed alternatively without departing from the teachings of the present invention. Like numbers refer to like elements throughout the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

It will be appreciated that any of the aspects, features and options described in view of the system apply equally to the method and the described master device, apparatus comprising the system and battery cell. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
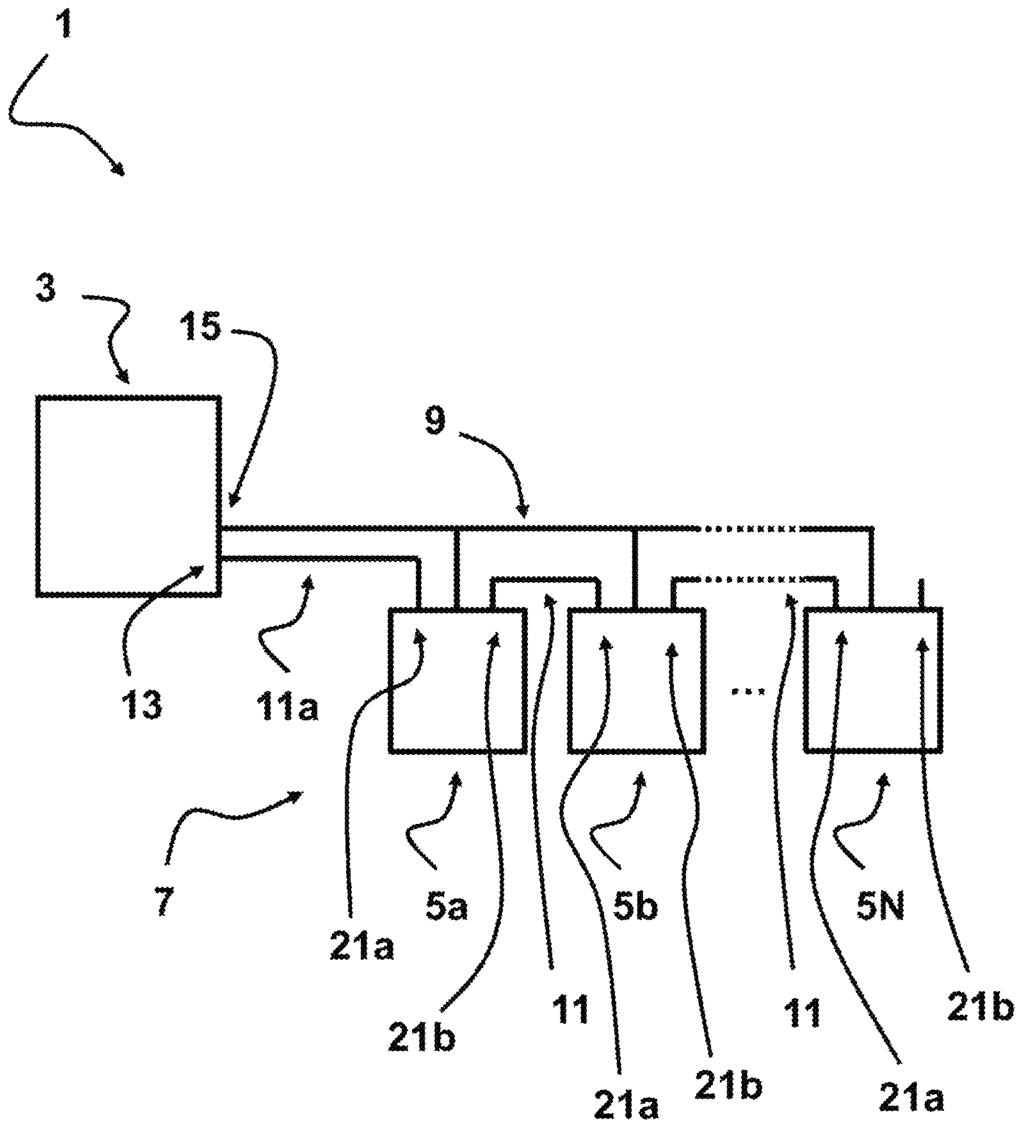
FIG. 1 shows a schematic diagram of an embodiment of a system.

FIG. 1 shows a schematic diagram of an embodiment of a daisy chain connected master-slave communication system 1 comprising a master 3 and a concatenation of N slaves 5*a*-5N linked in a chain 7, wherein the master 3 is connected to each of the N slaves 5*a*-5N through a communication line 9. The system 1 is configured to use the communication line 9 for serial data communication from the master 3 to the N slaves 5*a*-5N. A n-th slave is connected with a (n+1)-th slave through a chain line 11, wherein n is an integer of one or more and less than N. The master 3 comprises a communication port 13 which is connected to a first slave 5*a* of the N slaves through a first chain line 11*a*. The system 1 is configured to employ the chain lines 11*a*, 11 for serial data communication from the slaves 5*a-n* to the communication port 13 of the master. In this example, the master has a further communication port 15 connected to the communication line 9.

The plurality of slaves N may be communicatively chained by means of the plurality of chain lines 11. Furthermore, the first chain line 11*a* provides a communicative connection of the first slave to the master. The second chain line 11 connects the first slave 5*a* to the second slave 5*b* (e.g. neighbour of the first slave), the third chain line 11 connects the second slave 5*b* to the third slave 5*c* (not shown), and so forth for all N slaves.

A master 3 may have one or more processing units. In some examples, the master is connected to one or more other units or members, for example a control unit.

The system 1 may be configured such that the chain lines 11*a*, 11 are usable as configuration lines. In configuration mode of the system, two directions of configurations may be possible. For example, from the outer left slave (i.e. first slave) to the outer right slave (i.e. last slave N), or vice versa from the outer right slave to the outer left slave (not shown in this exemplary illustration). In configuration mode, the master can determine the number of slaves in the network and their arrangement/configuration (cf. order in chain) by assigning unique addresses. This may for instance happen in a similar way as in a local interconnect network (LIN-network).

For example, a logic state at the first port 21*a* of the first slave 5*a* may be "0"/"low" or "1"/"high", while a logic state of a first port 21*a* of the other slaves (also second slave) may be still "1"/"high" or "0"/"low", respectively. The first port 21*a* of the n-th slave is coupled to the second port 21*b* of the (n−1)-th slave via a chain line 11. For example, initially the first port 21*a* of the slaves subsequent to the first slave 5*a* in the chain (e.g. second slave 5*b*, third slave 5*c*, etc.) have a "1"/"high" logic state whilst the first port 21*a* of the first slave 5*a* has an opposite "0"/"low" logic state. In this way, it can be identifies that the first slave 5*a* is actually the first slave 5*a* in the chain of N slaves. The first slave 5*a* can then be configured for example as "SLAVE1" (cf. address assignment). Subsequently, the first slave 5*a* may change the logic state at its second port to "0"/"low" from "1"/"high". The next time the master 3 sends a command (e.g. broadcast query), the first port 21*a* of the second slave is "0"/"low" (i.e. due to change of the second port of the first slave), and the other slaves will still have a "1"/"high" state at their second ports. Similarly, the second slave 5*b* can be configured for example as "SLAVE2" (cf. address assignment) and the second port 21*b* of the second slave 5*b* can be changed to a "0"/"low" state from a "1"/"high" logic state. The slaves can be configured sequentially in this way. This process can be repeated for the other slaves in the chain of slaves until the configuration of the N slaves has been finished.

The slaves may send for example measurement temperature (e.g. temperature, electric quantity, voltage, etc.) to the master 3 for processing. This can be performed in communication mode, typically subsequent to the configuration mode explained above. In some examples, the master 3 may use the data from the slaves for processing, analysis, control, etc. A half-duplex communication between the master and the slaves is often too limiting (especially when there are a relatively large number of slaves), since the master has to request the data from the slaves one by one and provide sufficient time for each slave to sent the data separately to the master. The system according to the disclosure provides for a full duplex communication in an advantageous way.

Advantageously, in some examples, the slaves are configured to forward their data over the chain lines 11 (cf. usable as "configuration lines" when the system is in configuration mode). For example, one slave can forward data to the downstream neighbour slave, and which in turn forwards it to the further downstream neighbour, etc., until the data reaches the master. In this way, the data from the slaves can be communicated significantly more efficiently to the master. A cost-effective system is achieved in this way. Furthermore, the position of the slaves (e.g. physical positioning in the system) may also play an important role. The slaves may for example be coupled to a specific unit or member (e.g. a particular battery cell, a sensor, an actuator, etc.). By performing the configuration, the slaves may be assigned to a position (e.g. address, positioning). As the data from the slaves is received in a correct sequence through the chain lines, information about the positioning of the slaves can be derived.

For example, in case of a defect, it may be necessary to have information with regard to the position of the slaves, such that the defective device can be easily pinpointed and replaced. After replacement, the system may be re-configured (cf. configuration mode), after which the system can be used in communication mode.

Typically, configuration is performed during initialization of the system. For example, in an example in which the system is employed in a battery system, the slaves may be linked to battery cells, and during configuration it can be determined which slave is linked to which battery cell (cf. location). For example, the first slave can be linked to the first battery cell, the second slave can be linked to the second battery cell, etc. In communication mode, the master can then easily query the slaves. For example, the master 3 may require data from the third battery cell, and query the third slave.

Figure 2:
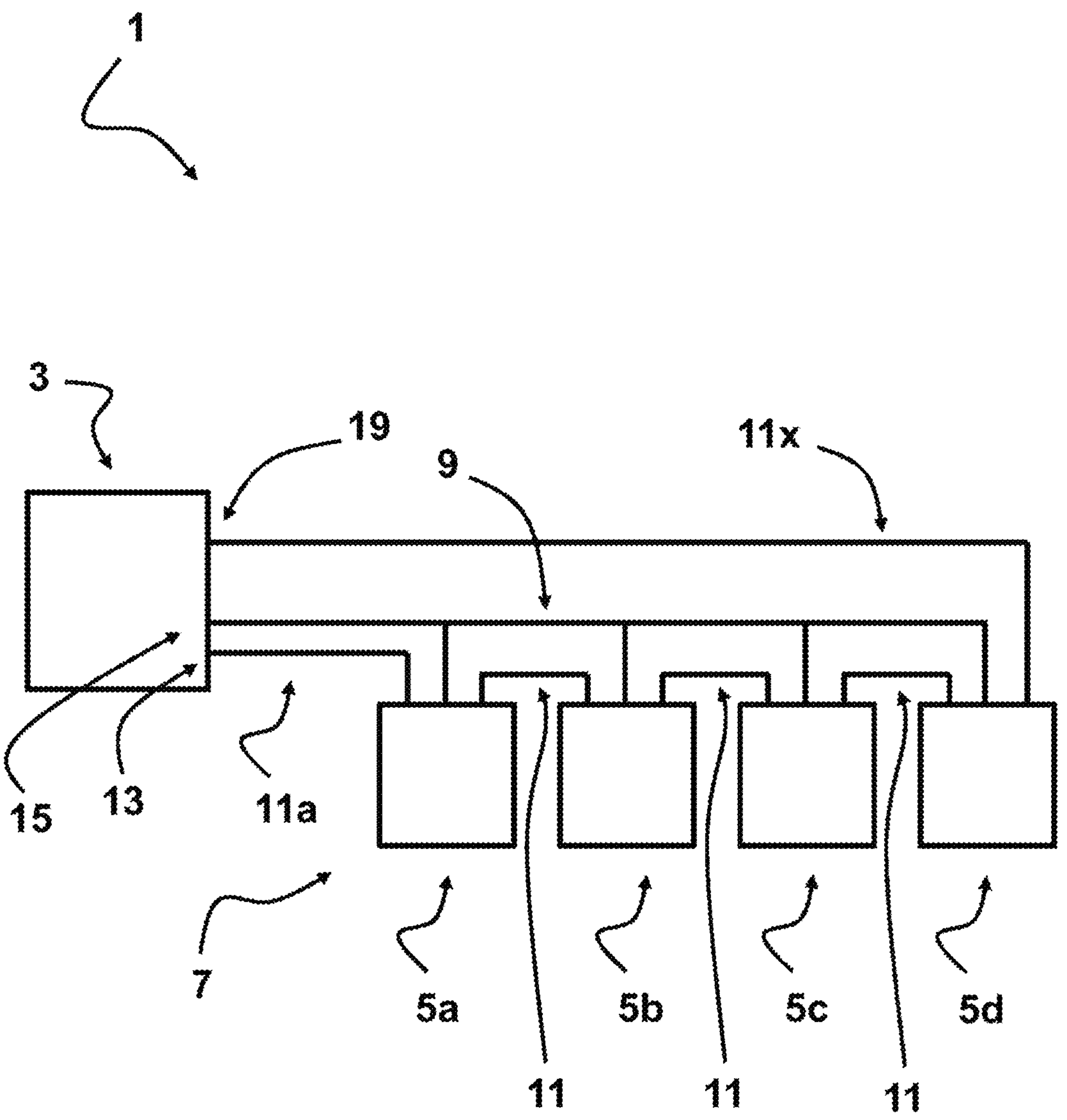
FIG. 2 shows a schematic diagram of an embodiment of a system.

FIG. 2 shows a schematic diagram of an embodiment of a daisy chain connected master-slave communication system 1. In this example, four slaves 5*a*-5*d* are arranged in a chain configuration. The last slave 5*d* may be connected or connectable to the master 3 by means of a chain line 11*x*. This chain line 11*x* may be usable for selecting the direction of configuration (in configuration mode) and/or the direction of communication (in communication mode). More particularly, in this example, the direction for configuration may be from left to right using the first chain line 11*a*, or from right to left using the chain line 11*x*. Similarly the direction of communication through the chain lines can be chosen in this way. In this example, chain line 11*x* is connected to a communication port 19. Alternatively, in some examples, instead of two communication ports 13, 19, one communication port is used for providing a chain line to the first and the last slave.

The system 1 can be usable in a configuration mode, in which the multiple slaves (N) can be assigned a (unique) address, and in a communication mode, in which serial data communication between the master and the slaves can occur.

The chain lines 11 can be configured to provide at least one interconnect between each pair of adjacent slaves in the daisy chain configuration. The slaves may have at least two data ports, namely a first data port 21*a* and a second data port 21*b* configured to communicate over chain lines. The first and second data ports 21*a*, 21*b* may be serial data ports configured to enable a serial communication link.

Figure 3:
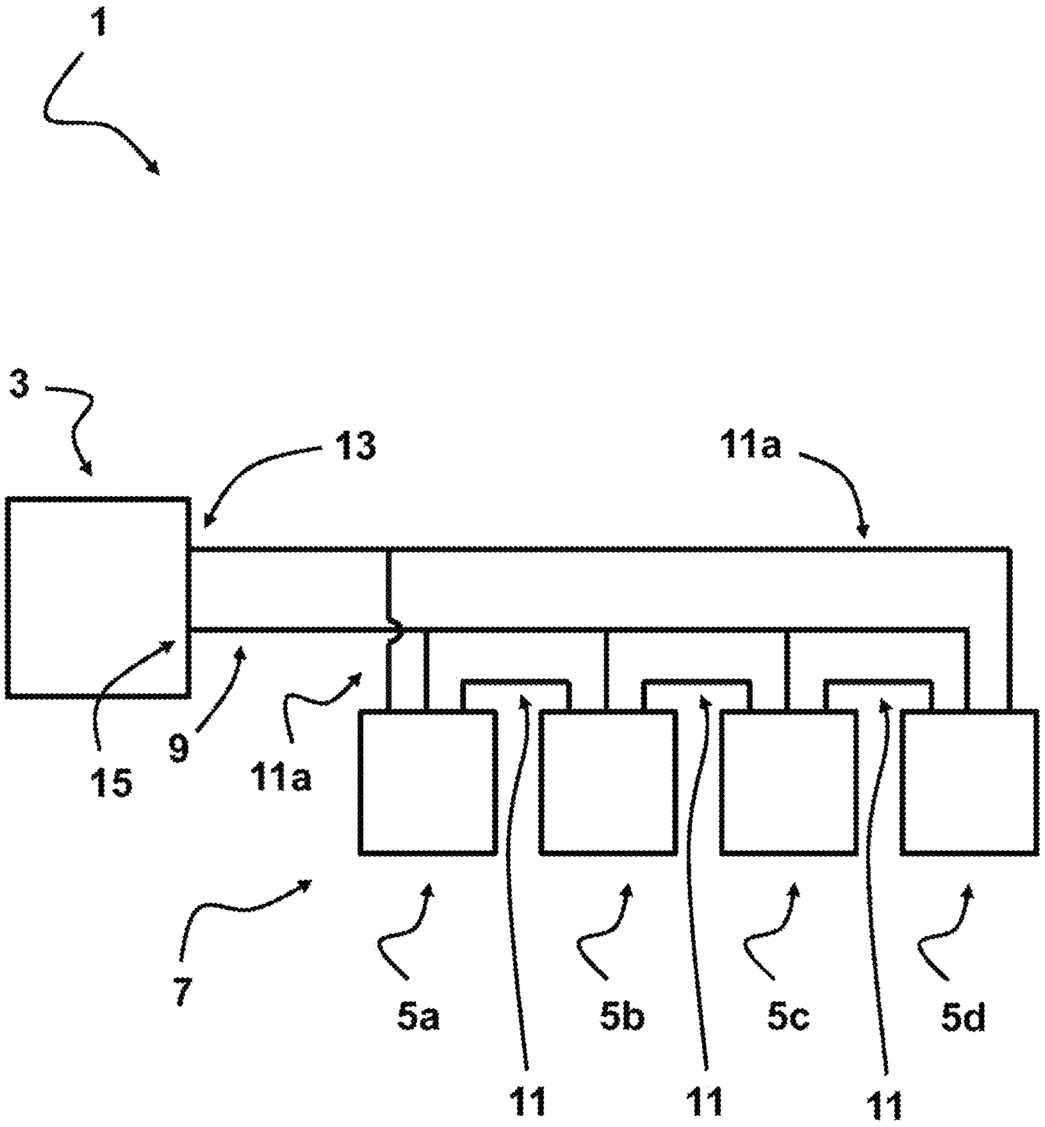
FIG. 3 shows a schematic diagram of an embodiment of a system.

FIG. 3 shows a schematic diagram of an embodiment of a daisy chain connected master-slave communication system 1. The slaves are arranged in a daisy chain configuration. In this example, the first slave 5*a* and last slave 5*d* are connected to the communication port 13 of the master by means of first chain lines 11*a*. This provides an easy way of selecting the direction of configuration and/or direction of communication.

The system provides for an advantageous method of communicating data between a plurality of slaves arranged in a daisy chain configuration. With a limited additional wiring a highly efficient and full-duplex communication between the master and the slaves can be achieved.

If the first and last chain lines are connected to the same communication port of the master, the system may include anti-collision means configured to prevent data collision during data communication. In some examples, it may be prevented that two slaves transmit data simultaneously via the same line. This can be done in different ways (e.g. time slots, priority system, etc.). In some examples, the data collision is prevented by means of a protocol layer.

Figure 4:
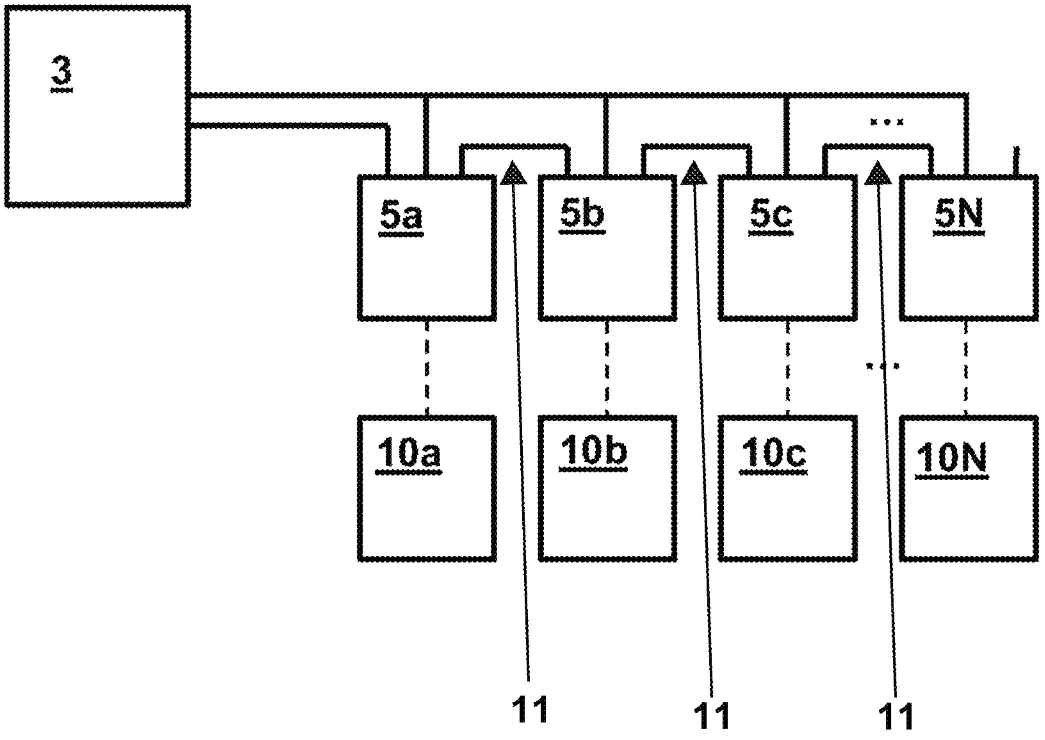
FIG. 4 shows a schematic diagram of an embodiment of a system.

FIG. 4 shows a schematic diagram of an embodiment of a daisy chain connected master-slave communication system 1. The slaves 5*a*-5N are interconnected together in a daisy chain. The chain lines 11 may be communication links which are configured to couple together the plurality of slaves 5*a*-5N. The chain lines 11 may be arranged between first and second data ports of slaves. The plurality of slaves 5*a*-5N are each coupled to a sensor and/or actuator 10*a*-10N, respectively. It will be appreciated that various alternative circuit arrangements may be employed.

In some examples, the system 1 according to the disclosure may be configured to provide communication between multiple components in a vehicle. The system 1 can effectively provide for a cost-effective high bandwidth communication network.

In some examples, the slaves are units integrated into battery cells. In such a case, it is strongly desired to have a low number of wires. Advantageously, the daisy chain connected master-slave communication system according to the disclosure provides for a robust and cost-effective way to achieve simultaneous bidirectional communication between the master and the slaves (cf. full-duplex mode communication).

The master and slaves may be microcontrollers. Various types of hardware can be used for the master and slaves. For example, the master and slaves may be microcontrollers. In some examples, the master and/or slaves are ASICS.

It will be appreciated that the system provides a cost-effective communication network, which can support remote applications within a vehicle network. For example, the system can be used for mechatronic nodes in distributed automotive applications. However, the system is also applicable in other arrangements or systems, for example in industrial applications.

Figure 5:
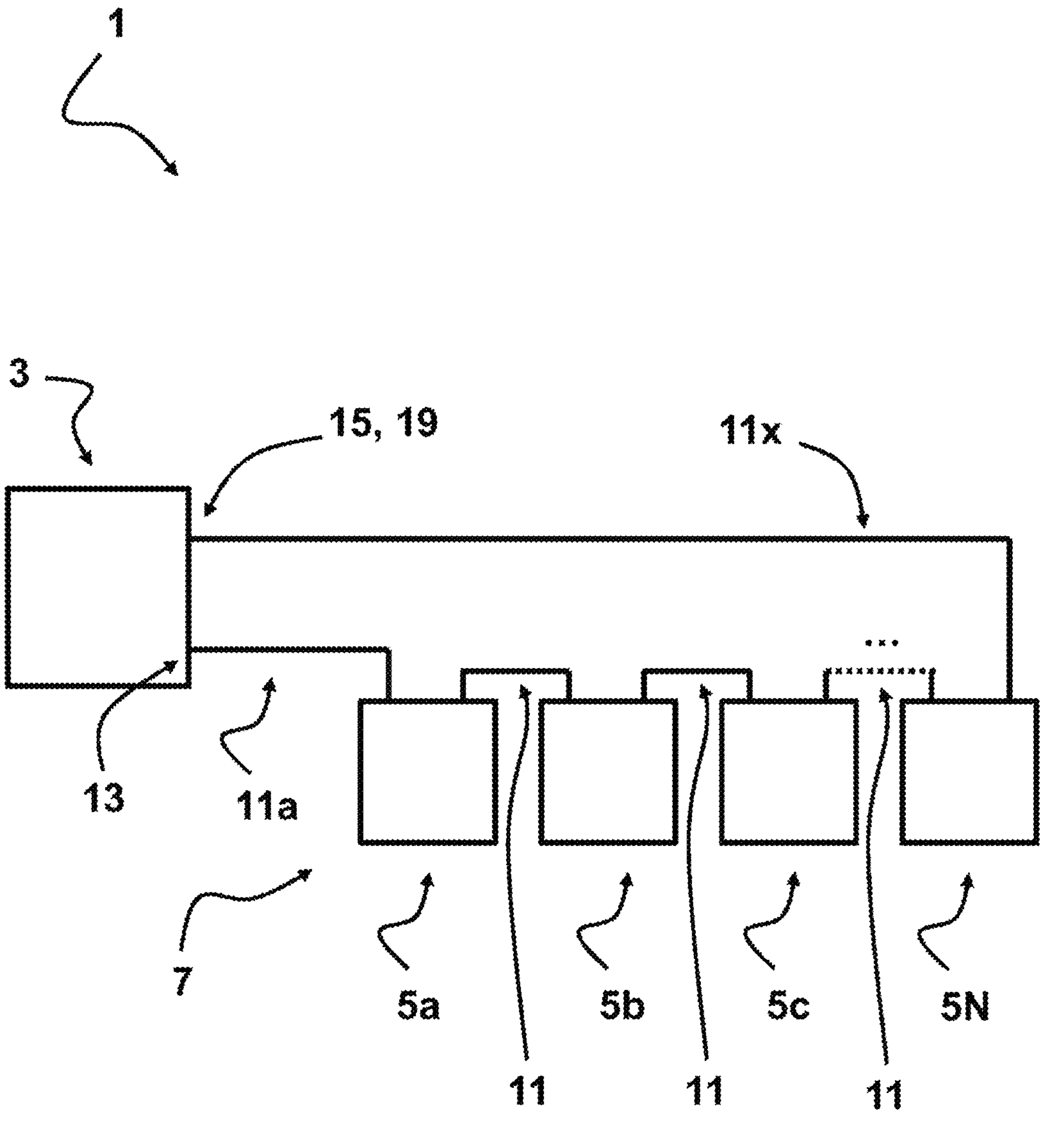
FIG. 5 shows a schematic diagram of an embodiment of a system.

FIG. 5 shows a schematic diagram of an embodiment of a daisy chain connected master-slave communication system 1. The slaves are arranged in a daisy chain configuration. In this example, the first slave 5*a* and last slave 5N are connected to a first communication port 13 and a second communication port 15, 19 of the master, respectively. The chain lines 11*a*, 11, 11*x* provide for a looped connection between the master and the slaves. This provides an easy way of selecting the direction of configuration and/or direction of communication.

The system 1 shown in FIG. 5 provides for a daisy chain connected master-slave communication system comprising a master and a concatenation of N slaves linked in a chain, wherein a n-th slave is connected with a (n+1)-th slave through a chain line, n being an integer of 1 or more and less than N, wherein the master 3 comprises a first communication port 13 which is connected to a first slave 5*a* of the N slaves through a first chain line 11*a*, and wherein the master 3 comprises a second communication port 15, 19 which is connected to a last slave of the N slaves through a last chain line 11*x*, and wherein the system 1 is configured to employ the chain lines 11*a*, 11, 11*x* for serial data communication between the slaves 5*a*-N and the master 3.

In this example, data can be communicated from the last slave 5N to the previous slave 5N-1, and so on, until all the data from the slaves has reached the master via the first chain line 11*a* at the communication port 13 of the master 3. The data of the slaves can thus reach the master from right to left in this exemplary illustration. However, the system is also configured to send data from the master via the further/second communication port (15, 19) to the slaves. The slaves can transmit the relevant data to the other slaves in the chain of slaves. The data from the master to the slaves can be relayed by the slaves using the chain lines. In this way, a full-duplex communication can be achieved in an advantageous way, without requiring addition communication line connecting the master to each of the slaves.

Advantageously, the chain line 11*x* which connects the last slave to the master can provide a two-way configuration in configuration mode, and a two-way communication in communication mode. Using the chain line 11*x* also for data communication provides significant advantages for obtaining a full duplex communication with a simple and cost-effective design. In some examples, the chain lines 11, 11*x* can be used for serial data communication from the master to the slaves, and the chain lines 11*a*, 11 can be used for serial data communication from slaves to the master, and/or vice versa.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, chips, integrated circuits, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A daisy chain connected master-slave communication system comprising:

a master and a concatenation of N slaves linked in a chain, N being an integer of 2 or more, wherein the master is directly connected to each of the N slaves through a single communication line, wherein the system is configured to use the communication line for unidirectional serial data communication from the master directly to each of the N slaves, wherein a n-th slave is connected with a (n+1)-th slave through a chain line, n being an integer of 1 or more and less than N, wherein the master comprises a communication port which is additionally connected to a first slave of the N slaves through a first chain line, wherein the master-slave communication system is configured to be switchable between a configuration mode, in which daisy chain address assignment is performed using the chain lines, and a communication mode, in which full-duplex data communication is performed, and wherein the system is configured to employ the chain lines for unidirectional serial data communication from the slaves to the communication port of the master, thereby enabling full-duplex data communication between the master and the N slaves during the communication mode.

2. The daisy chain connected master-slave communication system according to claim 1, wherein the communication port is a serial data port, and wherein the chain lines form a serial communication link between the N slaves and the master for transferring sensory data of one or more slaves of the N slaves to the master.

3. The daisy chain connected master-slave communication system according to claim 1, wherein each of the N slaves is configured to forward an entire set of data signals received from its preceding slave in the chain to another slave in the chain until the set of data signals reaches the master via chain lines.

4. The daisy chain connected master-slave communication system according to claim 1, wherein each of the N slaves are configured to transmit their data to a downstream neighbor slave in case of a broadcast request sent by the master to the slaves, wherein the data is buffered and sent out to a downstream neighbor slave as soon as the slave has finished transmitting its own data.

5. The daisy chain connected master-slave communication system according to claim 1, wherein each of the N slaves are configured to transmit their data to a downstream neighbor slave in case of a broadcast request sent by the master to the slaves, wherein the data is directly piped from one slave to another until the data transmitted by all the slaves has been received by the master.

6. The daisy chain connected master-slave communication system according to claim 1, wherein the master is configured to receive data packages in an order in which the slaves are connected to each other in the daisy chain, and wherein the master is configured to determine locations of the slaves in the daisy chain based on said order.

7. The daisy chain connected master-slave communication system according to claim 1, wherein the N slaves are associated to sensors and/or actuators.

8. The daisy chain connected master-slave communication system according to claim 1, wherein the master is in parallel connection with each of the N slaves through the single communication line, wherein the parallel connection provides a direct communication between the master and the N slaves.

9. The daisy chain connected master-slave communication system according to claim 1, wherein the master is in series connection with the N slaves through the chain lines, wherein the series connection provides an indirect communication between the master and at least a subset of the N slaves.

10. A method of communicating data between a concatenation of N slaves arranged in a daisy chain and interconnected by means of chain links, N being an integer of 2 or more, and a master directly connected to each of the N slaves through a single communication line, wherein a n-th slave is connected with a (n+1)-th slave through a chain line, n being an integer of 1 or more and less than N, wherein the master is provided with a communication port which is additionally connected to a first slave of the N slaves through a first chain line, wherein the method includes switching between a configuration mode, in which daisy chain address assignment is performed using the chain lines, and a communication mode, in which full-duplex data communication is performed, wherein the communication line is used for unidirectional serial data communication from the master directly to each of the N slaves, and wherein the chain lines are used for unidirectional serial data communication from the slaves to the communication port of the master, thereby enabling a full-duplex data communication between the master and the N slaves during the communication mode.

11. A battery system comprising a daisy chain connected master-slave communication system, wherein the daisy chain connected master-slave communication system comprises:

a master and a concatenation of N slaves linked in a chain, N being an integer of 2 or more, wherein the master is directly connected to each of the N slaves through a single communication line, wherein the system is configured to use the communication line for unidirectional serial data communication from the master directly to each of the N slaves, wherein a n-th slave is connected with a (n+1)-th slave through a chain line, n being an integer of 1 or more and less than N, wherein the master comprises a communication port which is additionally connected to a first slave of the N slaves through a first chain line, wherein the battery system is configured to be switchable between a configuration mode, in which daisy chain address assignment is performed using the chain lines, and a communication mode, in which full-duplex data communication is performed, and wherein the system is configured to employ the chain lines for unidirectional serial data communication from the slaves to the communication port of the master, thereby enabling full-duplex data communication between the master and the N slaves during the communication mode.

12. The battery system according to claim 11, wherein the communication port is a serial data port, and wherein the chain lines form a serial communication link between the N slaves and the master for transferring sensory data of one or more slaves of the N slaves to the master.

13. The battery system according to claim 11, wherein each of the N slaves is configured to forward an entire set of data signals received from its preceding slave in the chain to another slave in the chain until the set of data signals reaches the master via chain lines.

14. The battery system according to claim 11, wherein each of the N slaves are configured to transmit their data to a downstream neighbor slave in case of a broadcast request sent by the master to the slaves, wherein the data is buffered and sent out to a downstream neighbor slave as soon as the slave has finished transmitting its own data.

15. The battery system according to claim 11, wherein each of the N slaves are configured to transmit their data to a downstream neighbor slave in case of a broadcast request sent by the master to the slaves, wherein the data is directly piped from one slave to another until the data transmitted by all the slaves has been received by the master.

16. The battery system according to claim 11, wherein the master is configured to receive data packages in an order in which the slaves are connected to each other in the daisy chain, and wherein the master is configured to determine locations of the slaves in the daisy chain based on said order.

17. The battery system according to claim 11, wherein the N slaves are associated to sensors and/or actuators.

18. The battery system according to claim 11, wherein the master is in parallel connection with each of the N slaves through the single communication line, wherein the parallel connection provides a direct communication between the master and the N slaves.

19. The battery system according to claim 11, wherein the master is in series connection with the N slaves through the chain lines, wherein the series connection provides an indirect communication between the master and at least a subset of the N slaves.

* * * * *